May 28, 1929.  D. C. SCOTT  1,714,638
TESTING MACHINE
Filed March 31, 1927
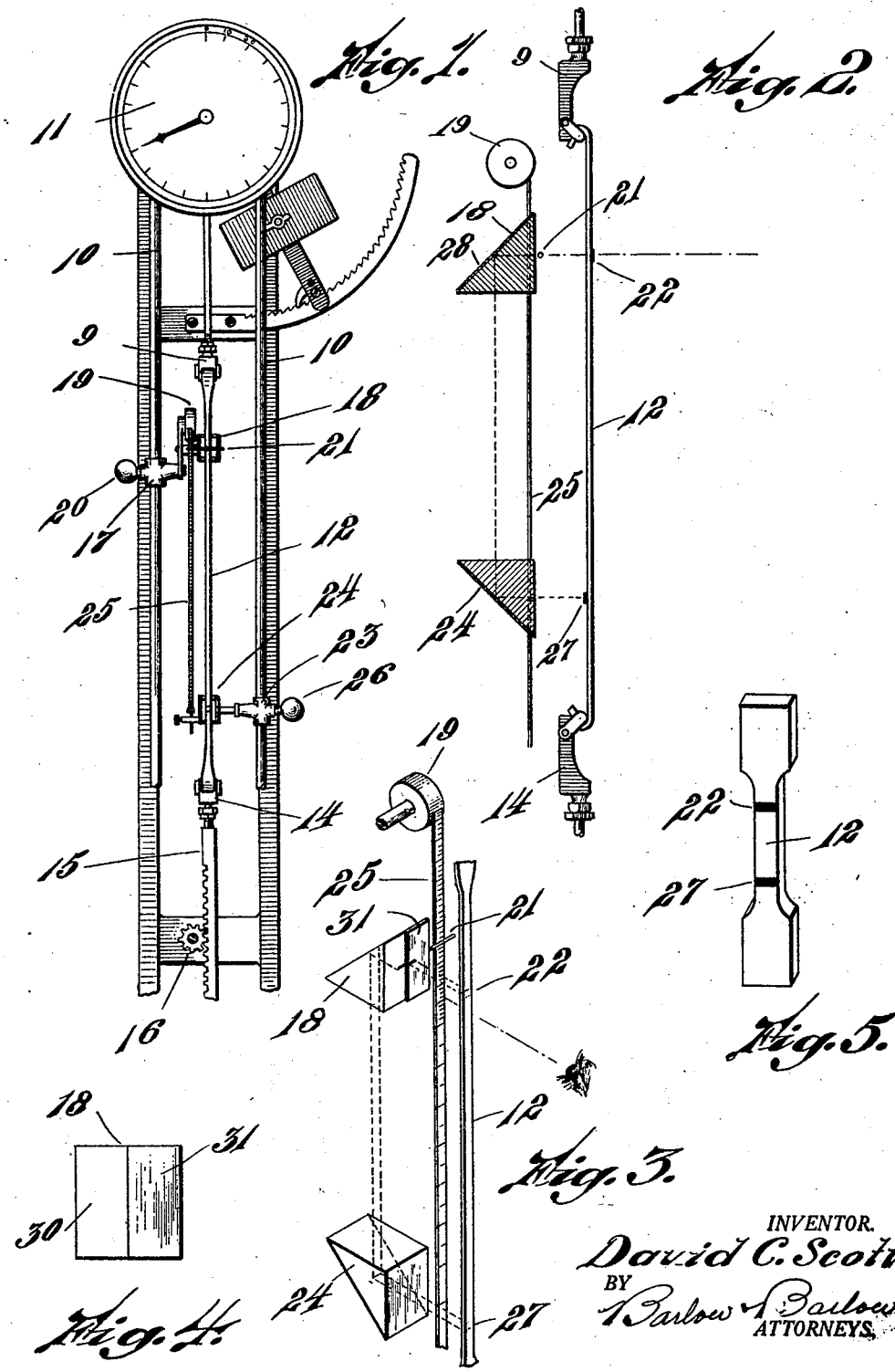
INVENTOR.
David C. Scott.
BY
Barlow & Barlow
ATTORNEYS.

Patented May 28, 1929.

1,714,638

UNITED STATES PATENT OFFICE.

DAVID C. SCOTT, OF PROVIDENCE, RHODE ISLAND, ASSIGNOR TO HENRY L. SCOTT COMPANY, OF PROVIDENCE, RHODE ISLAND, A CORPORATION OF RHODE ISLAND.

TESTING MACHINE.

Application filed March 31, 1927. Serial No. 179,878.

This invention relates to an attachment for testing machines to obtain a more accurate reading of the stretch measuring device while tension is being applied to the material; and the object of this invention is to provide means whereby both of the designating points or marks on the specimen may be observed from a single point of observation.

A further object of the invention is the provision of a pair of prisms arranged to cooperate and project one of the stretch designating marks on the specimen and a second prism which may be located opposite the second designating mark on the specimen whereby the one mark may be compared and lined up with the other reflected mark so that when both are in line with each other a reading on an adjacent graduated scale will show the stretch of the specimen.

The invention further consists in the mounting of two prisms to be moved independently of each other, each to follow its designating mark on the specimen as the two are being moved apart to follow the stretch of the specimen, whereby it is only necessary for the observer to watch but one of the marks on the specimen so that when the prisms are adjusted to bring these two marks in alignment with each other the reading may be taken from the adjacent scale to show the stretch of the specimen.

A still further object of the invention is the provision of a pair of reflector members one having a single reflector and the other a double reflecting surface, the two prisms being arranged to independently follow the designating marks on the specimen as the same is stretched due to the tension applied, the lower mark being reflected from the lower prism into the upper prism and the second reflecting surface on the upper prism also showing the upper designating mark on the specimen whereby when the prisms are adjusted to bring both reflected marks in alignment on the double surfaced reflector then by observing the measurement on the scale the amount of stretch of the specimen is readily determined, all from a single point of observation.

With these and other objects in view, the invention consists of certain novel features of construction, as will be more fully described, and particularly pointed out in the appended claims.

In the accompanying drawings:

Figure 1 is front elevation showing a portion of a testing machine for indicating a specimen of rubber therein and the arrangement of mechanism by which the stretch may be readily determined from a single point of observation.

Figure 2 is a diagrammatical view illustrating one arrangement of prisms whereby the lower designating mark on the sample is reflected from the lower prism to the upper prism which may be brought into alignment with the upper designating mark on the specimen whereby both marks are observed from a single point of observation.

Figure 3 is a perspective view showing the general arrangement of the parts and showing the upper prism as being provided with a double surface whereby both the lower and upper designating marks on the specimen may be observed in these two different reflecting surfaces.

Figure 4 is a detail of the upper prism which is provided with a double reflecting surface.

Figure 5 is a standard form of rubber specimen to be tested.

It is found in the practical operation of testing machines particularly those employed for testing the strength and stretch of rubber specimens of advantage to provide a specimen of standard size having established designating upper and lower marks, the ends of the specimen being clamped in the machine to be pulled apart by the tensioning mechanism. As power is applied the upper mark moves downwardly slightly while the lower mark moves downwardly to a considerable extent and the distance between the upper and lower marks determines the stretch of the specimen. Heretofore, the operator was obliged to watch both marks as they separated and then take a reading on the face of the adjacent measuring scale to determine the stretch and this was found quite difficult for the operator to accurately follow the movement of both marks simultaneously taken especially when they are widely separated. Therefore I have devised a simple and effective method of reading whereby both of the designating points may be observed from a single point of observation. One method of which is the positioning of a pair of prisms for projecting the image of the lower mark into the upper prism whereby on adjustment of the upper prism relative to the upper designating mark on the specimen, both the upper and lower marks may be read from a single point of observation by the eye of the observer positioned at the upper mark from which position he can see the upper mark on the specimen and the lower mark reflected in the prism beyond.

In some other instances I provide a double reflecting surface on the upper reflecting member, whereby the lower designating mark is reflected into the upper prism mirror and the upper designating mark is also reflected on another vertically disposed mirror surface and when these two marks are brought into alignment with each other on the upper prism they may be projected across on the scale and thus very accurate readings at any desired interval of separation may be obtained and recorded in any desired manner; and the following is a detailed description of the present embodiment of my invention and showing one arrangement of mechanism by which these advantageous results may be accomplished:—

With reference to the drawings, 10 designates vertically disposed spaced guide rods on the testing machine at the upper end of which the dial 11 is mounted to show in pounds or other unit of measure the stress strain applied to the specimen 12 being attached to the clamp 9 which is suspended from this strain recording mechanism and the lower end of the specimen is connected by the clamp 14 to the power applying mechanism which is actuated through the rack 15 and a pinion 16. On the left of the two rods 10, I have mounted a friction slide member 17 which supports the upper reflecting member 18 and the upper portion of the flexible measuring scale 25 which may be housed in the reel 19. This guide is provided with an operating handle 20 by which it may be slid vertically along its rod to cause its hairline marker 21 to follow the upper designating mark 22 on the specimen as the same moves downwardly slowly as the strain is applied to the specimen.

On the opposite or right hand rod 10 is mounted the friction slide member 23 which supports the lower reflector member 24 and to which lower member is connected the lower end of the measuring scale 25, and this guide is provided with an operating handle 26 by which the prism 24 and the lower end of the scale 25 may be moved downwardly by the hand of the operator to follow the lower designating mark 27 on the specimen 12. The members 18 and 24 are preferably made in the form of prisms, the rear reflecting surface of prism 24 being arranged to reflect or project an image of the designating line or mark 27 on the specimen up under the rear reflecting surface 28 of the upper prism 18, whereby the observer at the point 29 may look across the upper designating mark 22 on the specimen and then adjust the prisms to bring the lower mark in line with the upper mark whereby both will be observed from a single point of observation and these marks may then be projected onto the adjacent scale and the stretch of the specimen arcuately observed at all times and at any given interval may be recorded on a chart or the like in any manner desired.

In some instances instead if using two ordinary prisms I may provide a portion of the vertically disposed face 30 of the upper prism with a reflector surface 31 whereby as illustrated in Figure 3 the lower designating mark on the specimen is reflected up into the uncovered surface of the upper prism while the upper mark 22 may be seen on the reflecting surface 31 and when these two marks are brought into alignment with each other and a reading taken on the scale 25, the stretch of the specimen between these upper and lower marks may be accurately read.

By use of my attachment to a testing machine the stretch between two given points or marks on the specimen may be readily observed and followed from a single point of observation and if desired the result may be recorded on a chart or the like in any suitable way by the observer at regular intervals.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a testing machine, means for applying tension to the specimen being tested, a graduated element positioned adjacent the specimen and reflecting means positioned adjacent the specimen for showing certain spaced points on the specimen from a single point of observation.

2. In a testing machine, means for applying tension to the specimen being tested, a graduated element positioned adjacent the specimen for indicating the amount of stretch of the specimen, a pair of reflector members mounted to be moved to follow marked points on the specimen as the same stretches and reflect the distance of the marked points on the specimen so that both points may be observed from a single position of observation.

3. In a testing machine, means for applying tension to the specimen being tested, a graduated element positioned adjacent the specimen for measuring the stretch of the specimen between two spaced designating marks on the specimen, a pair of reflectors mounted to be moved independently each to follow its separate designation, said reflectors being annularly arranged whereby one of said marks is reflected to be observed from a point of observation of the other mark.

4. In a testing machine, tension applying mechanism, means including graduated scale for measuring the stretch of the specimen between two spaced designating marks on the specimen, a pair of prisms mounted to be moved independently each to independently follow its separate designating mark on the specimen, said prisms being so arranged that both of the separated marks on the specimens may be observed in one prism and the stretch indicated on said scale.

5. In a testing machine tension applying mechanism, means for measuring the stretch of a specimen having spaced marks thereon including two cooperating spaced prism members positioned to show the spaced designating marks on the specimen, one of said prism members having means to reflect one of said marks and cooperate with the other prism for reflecting the other mark whereby both of said designating marks on the specimen may be observed from a single point.

6. In a testing machine, tension applying mechanism, means for measuring the stretch of a specimen having spaced marks thereon including two cooperating spaced reflector members one positioned to reflect into the other its adjacent designating mark on the specimen said other member being provided with a second mirror for reflecting the adjacent designating mark on the specimen, whereby both marks on the specimen may be observed in one reflector member.

7. In a testing machine, tension applying mechanism, means for measuring the stretch of a specimen having spaced marks thereon including two cooperating spaced reflector members, one positioned to reflect into the other its adjacent designating mark on the specimen, said other member being provided with a second mirror for reflecting the adjacent designating mark on the specimen, whereby both marks on the specimen may be observed in one reflector member, and a cooperating graduated scale positioned adjacent said other reflector with the double reflecting surface to be observed simultaneously to determine the amount of stretch.

8. In a testing machine, means for applying tension to the specimen being tested, means for indicating the amount of stretch of the specimen between two spaced designating marks thereon, a pair of reflector members, one having a single and the other a double reflecting surface and arranged to be adjusted with the stretch of the material to follow the designating marks thereon, the single reflector being arranged to project its mark on the specimen to be seen on one of the surfaces of the double reflector and the other surface of said double reflector to simultaneously show its adjacent designating mark, a scale mounted adjacent the double surfaced reflector whereby a reading on said scale when said marks show in alignment on the reflector shows the stretch of the specimen.

In testimony whereof I affix my signature.

DAVID C. SCOTT.